(12) United States Patent
Coughlin (10) Patent No.: US 7,055,207 B2
(45) Date of Patent: Jun. 6, 2006

(54) UNIVERSAL WIPER ADAPTER AND WIPER BLADE ASSEMBLY INCORPORATING SAME

(75) Inventor: Timothy J. Coughlin, Holly, MI (US)

(73) Assignee: Trico Products Corporation, Rochester Hills, MI (US)

( * ) Notice: Subject to any disclaimer, the term of this patent is extended or adjusted under 35 U.S.C. 154(b) by 264 days.

(21) Appl. No.: 10/637,835

(22) Filed: Aug. 8, 2003

(65) Prior Publication Data
US 2005/0028312 A1 Feb. 10, 2005

(51) Int. Cl.
*B60S 1/40* (2006.01)
(52) U.S. Cl. .................................. 15/250.32
(58) Field of Classification Search .......... 15/250.32, 15/250.43, 250.44, 250.351, 250.361; 403/3, 403/4, 321, 326, 329
See application file for complete search history.

(56) References Cited

U.S. PATENT DOCUMENTS

| 5,084,933 | A | * | 2/1992 | Buechele | 15/250.32 |
|---|---|---|---|---|---|
| 5,168,597 | A | | 12/1992 | Schon et al. | 15/250.32 |
| 5,332,328 | A | | 7/1994 | Yang | 403/154 |
| 5,392,487 | A | | 2/1995 | Yang | 15/250.32 |
| 5,606,765 | A | | 3/1997 | Ding | 15/250.32 |
| 5,611,103 | A | | 3/1997 | Lee | 15/250.32 |
| 5,618,124 | A | | 4/1997 | Chen | 403/3 |
| 5,632,059 | A | | 5/1997 | Lee | 15/250.32 |
| 5,807,016 | A | | 9/1998 | Herring et al. | 403/321 |
| 5,885,023 | A | | 3/1999 | Witek et al. | 403/321 |
| 5,937,474 | A | | 8/1999 | Hussaini | 15/250.32 |
| 6,161,249 | A | | 12/2000 | Hussaini | 15/250.32 |
| 6,332,236 | B1 | * | 12/2001 | Ku | 15/250.32 |
| 6,550,096 | B1 | | 4/2003 | Stewart et al. | 15/250.32 |
| 6,779,223 | B1 | * | 8/2004 | Roekens | 15/250.32 |
| 2002/0026681 | A1 | | 3/2002 | Nacamuli | 15/250.32 |
| 2004/0123414 | A1 | * | 7/2004 | Lee | 15/250.32 |

FOREIGN PATENT DOCUMENTS

FR 2377302 * 8/1978

* cited by examiner

*Primary Examiner*—Gary K. Graham
(74) *Attorney, Agent, or Firm*—Bliss McGlynn, P.C.

(57) ABSTRACT

The present invention relates to a universal wiper adapter for connecting a wiper blade assembly to a wiper arm including a pair of sidewalls having an aperture and a land extending between the sidewalls cooperating to define a channel. The present invention further includes a cantilevered beam, between the sidewalls, having a super-surface and a subsurface each cooperating with the sidewalls to define an elongate passage and an elongate track, respectively. The channel and the elongate passage cooperate to receive two sizes of hook-type wiper arms, while the channel and the elongate track cooperate to receive three sizes of hook-type wiper arms. The present invention also includes a substrate between the sidewalls cooperating with the land and the apertures to receive two sizes of pin-type wiper arms. The substrate further cooperates with the sidewalls and the land to define an elongate cavity to receive a bayonet-type wiper arm.

18 Claims, 9 Drawing Sheets

UNIVERSAL WIPER ADAPTER AND WIPER BLADE ASSEMBLY INCORPORATING SAME

BACKGROUND OF THE INVENTION

1. Field of the Invention

The present invention relates, generally, to windshield wiper assemblies. More specifically, the present invention relates to a universal wiper adapter and windshield wiper assembly incorporating same for use in connecting the wiper assembly to the wiper arm of a vehicle.

2. Description of the Related Art

Conventional windshield wiper assemblies known in the related art include some type of blade assembly mounted to an arm which, in turn, is mounted adjacent the windshield and pivotally driven to impart reciprocating motion to the wiper blade assembly across the windshield. A rubber wiping element is supported by the blade assembly and contacts the windshield across the surface to be wiped. The wiper arm terminates in an attachment mechanism that is received by a coupling device or adapter of the windshield wiper assembly.

There are a number of different types of attachment mechanisms commonly employed on the wiper arms known in the related art. These include one-quarter and three-sixteenth inch diameter pin type wiper arm attachment mechanisms; 7, 8 and 9 millimeter size hook-type wiper arms; as well as bayonet-type wiper arms. The coupling devices used in the windshield wiper assemblies must be configured to accept the various types of attachment mechanisms commonly employed on the wiper arms in the related art.

Windshield wiper assemblies are typically supplied to OEM vehicle manufacturers as a part of an overall wiper system. Thus, at this manufacturing level, there is usually not much concern over compatibility between the wiper assemblies and the wiper arm. They are designed to work together. However, compatibility is a problem in the aftermarket. Windshield wiper assemblies wear out and must be replaced. Aftermarket suppliers of windshield wiper assemblies must therefore be capable of adapting to the various attachment mechanisms that are used on wiper arms employed across a broad spectrum of the vehicles produced by a diverse group of OEMs. Universal wiper adapters were developed, in part, in response to the problem associated with properly mounting a windshield wiper assembly to any number of various types of attachment mechanisms commonly employed on the windshield wiper arms of the related art. The universal adapters are designed to accommodate more than one type of attachment mechanism.

For example, U.S. Pat. No. 6,332,236 issued on Dec. 25, 2001 to Ku discloses a wiper adapter that can accommodate four different attachment members including a bayonet-type, two different sizes of hook-types, and at least one size pin-type attachment members. U.S. Pat Nos. 5,332,328 and 5,392,487, both issued to Yang, disclose wiper adapters that are designed to accommodate wide or narrow hook-type attachment members; screw-on or slide-in bayonet-type attachment member; and small or large diameter pin-type attachment members. In total, the '328 and '487 patents disclose compatibility with six different types of wiper arm attachment members. U.S. Pat Nos. 5,611,103 and 5,632,059, both issued to Lee, disclose wiper adapters for attachment to wiper arms having 7 mm, 8 mm, or 9 mm hook-type; ¼ or 3/16 inch pin-type; or bayonet-type attachment members. In total, the '103 and '059 patents disclose wiper adapters that are designed to accommodate six different types of wiper arm attachment members.

While the wiper adapters known in the related art alleviate some of the problems associated with attaching a wiper blade assembly to various types of wiper arm attachment members, they suffer from the disadvantage that they are only capable of accommodating no more than six different types of wiper arm attachment. Yet, more than six different types and sizes of attachment members are commonly employed on the wiper arms in the related art. Further, many of the known adapters are mechanically complex, can be difficult to manufacture, and are therefore expensive. Thus, there remains a need in the art for a windshield wiper assembly that is adapted to be mounted to wiper arms having various types of attachment mechanisms. Further, there remains a need in the art for a universal wiper adapter that can accommodate all of the standard types of attachment configuration that are now commonly employed in the related art.

SUMMARY OF THE INVENTION

The present invention overcomes many limitations and disadvantages in the related art in universal wiper adapters, as well a wiper blade assembly replacement system incorporating same, for use in connecting a wiper blade assembly to a wiper arm attachment member. To this end, the universal wiper adapter assembly of the present invention includes a pair of sidewalls each including an aperture aligned with respect to each other. The sidewalls also include a land extending between the sidewalls cooperating to define a channel therebetween. The universal wiper adapter further includes a cantilevered beam extending between the sidewalls in spaced parallel relation to the land. The cantilevered beam includes a super-surface cooperating with the sidewalls to define an elongate passage. The channel and the elongate passage cooperate to operatively receive a first hook-type wiper arm attachment member of at least two different sizes. The cantilevered beam also includes a sub-surface cooperating with the sidewalls to define an elongate track. The channel and the elongate track cooperate to operatively receive a second hook-type wiper arm attachment member of at least three different sizes. The universal wiper adapter further includes a substrate extending between the sidewalls in parallel relation to and disposed between the land and the cantilevered beam. The substrate cooperates with the land and the apertures to receive at least two different diameter pin-type wiper arm attachment members. The substrate further cooperates with the sidewalls and the land to define an elongate cavity. The elongate cavity is adapted to operatively receive at least one style bayonet-type wiper arm attachment member.

Thus, one advantage of the present invention is that it provides an improved universal adapter suitable for attaching to a plurality of different wiper arm attachment mechanisms.

Another advantage of the present invention is that it reduces the need for multiple universal adapters to be packaged in connection with a wiper blade assembly replacement system.

Yet another advantage of the present invention is that the reduction in packaged universal adapters within a wiper blade assembly replacement system simplifies the task of replacing a wiper blade assembly.

Another advantage of the present invention is that it reduces the need to manufacture several different universal wiper blade assembly adapters.

Still another advantage of the present invention is that it provides a universal wiper adapter that is mechanically efficient, cost effective to manufacture, and that is specifically designed to accept a number of different attachment mechanisms employed by the OEMs in the related art.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
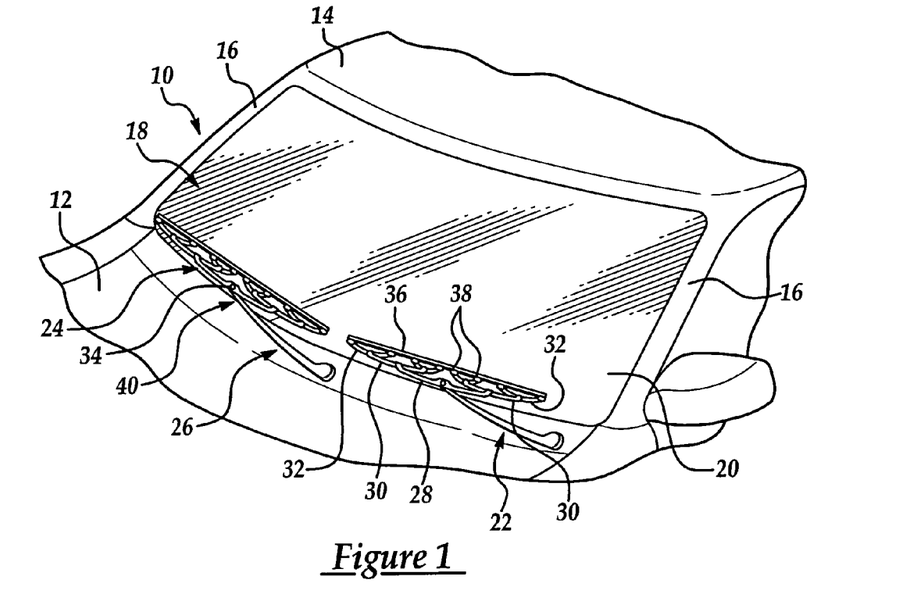
FIG. 1 is a partial perspective view of the front of an automotive vehicle having a pair of windshield wiper assemblies pivotally mounted for reciprocal movement across the windshield of the vehicle.

Referring now to the figures, where like numerals are used to designate like structure, a portion of a vehicle is schematically illustrated at 10 in FIG. 1. The vehicle body includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20.

A wiper system is generally indicated at 22 in FIG. 1 and is employed to clean the glass windshield 20. The wiper system 22 includes a pair of wiper blade assemblies, generally indicated at 24, which correspond to the driver and passenger side of the vehicle. Each wiper blade assembly 24 is carried by a corresponding wiper arm assembly, generally indicated at 26. The wiper arm assembly 26 includes an attachment member adapted to operatively engage a wiper blade assembly 24, as will be described in greater detail below. An electrical motor is employed to power the wiper system 22 to move the wiper blade assemblies 24 in an oscillating manner across the surface of the glass 20.

The wiper blade assemblies 24 illustrated in the Figures have a "tournament" style superstructure including a primary lever 28, two secondary levers 30, and a series of two or more tertiary levers 32. The wiper blade assembly 24 includes a pivot pin 34 disposed within the primary lever 28. The pivot pin 34 is adapted to operatively engage the attachment member of a wiper arm assembly 26. The secondary levers 30 are articulated to the primary lever 28 at pivot points located at the opposed, lateral ends of the primary lever 28. Similarly, the tertiary levers 32 are each articulated to a secondary lever 30 at pivot points located at the opposed lateral ends of the secondary levers 30. As illustrated in the Figures, the wiper arm assemblies 26 include one primary lever 28, two secondary levers 30 and four tertiary levers 32, but those of ordinary skill in the art will appreciate from the discussion that follows that the blade assembly superstructure may take a number of different forms without departing from the scope of the invention.

The wiper blade assembly 24 also includes an elongated rubber wiper element, generally indicated at 36. The wiper element 36 is mounted to the superstructure through claws 38 formed on the opposed distal ends of the tertiary levers 32. The working end of the wiper element 36 is operable for wiping action against the glass windshield surface 20. Each wiper arm assembly 26 includes a biasing mechanism (not shown) such as a spring that creates a force which is distributed to the wiper element 36 through the superstructure to clean the windshield 20.

While the wiper assembly 22 illustrated here is shown in connection with the front windshield 20 of the vehicle 10, those having ordinary skill in the art will appreciate that wiper systems 22 having wiper arm assemblies 26 and wiper blade assemblies 24 may be employed in other areas of a vehicle 10, such as a rear window (not shown) or a head lamp (not shown). Thus, it will be understood that the present invention is not limited for use solely in connection with wiper arms assemblies 26 and wiper blade assemblies 24 adapted for use on a vehicle's windshield 20, but for use in all applications where wiper arm assemblies 26 and wiper blade assemblies 24 are employed.

Generally speaking, the wiper blade assemblies 24 may be operatively secured to the wiper arm assembly 26 by way of the universal wiper adapter, generally indicated at 40, of the present invention, which serves as an adaptive coupling to interconnect the pivot pin 34 of wiper blade assembly 24 and the attachment member of a wiper arm assembly 26. The present invention may be employed as part of a wiper system 22 for use with broad spectrum of vehicles produced by a diverse group of OEMs. In addition, the universal wiper adapter 40 of the present invention may be employed as a replacement part to an OEM wiper system or as a component within a wiper blade assembly replacement system including the universal wiper adapter 40 and a wiper blade assembly 24.

Figure 2:
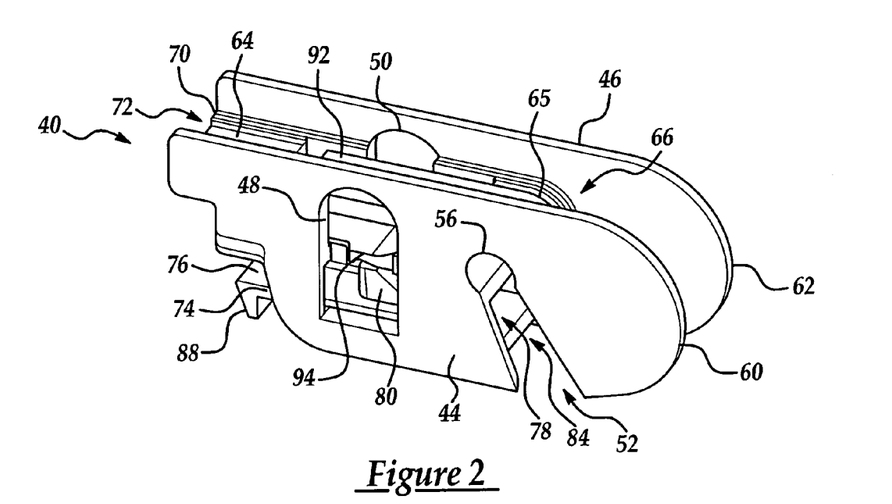
FIG. 2 is a side perspective view of the universal wiper adapter according to an embodiment of the present invention.
Figure 3:
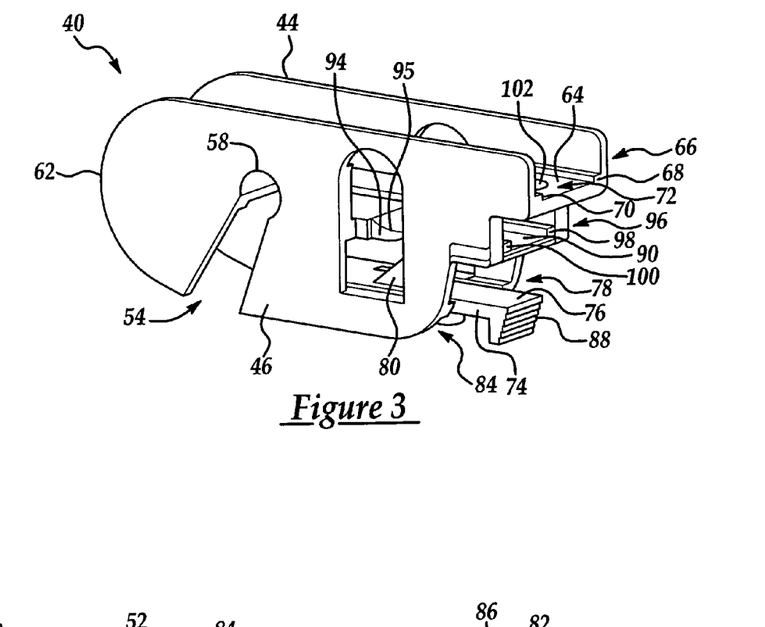
FIG. 3 is an opposite side perspective view of the universal wiper adapter according to an embodiment of the present invention.

In either event, the universal wiper adapter 40 of the present invention is adapted to operatively engage the pivot pin 34 of a wiper blade assembly 24. To this end and with specific reference to FIGS. 2–4, the universal wiper adapter 40 includes a pair of sidewalls 44, 46 each having an aperture 48, 50, respectively, that are aligned with respect to each other. Each of the sidewalls 44, 46 also includes a nock 52, 54, respectively, that are similarly aligned with respect to each other. Each nock 52, 54 has an arcuate rest 56, 58, respectively, formed at its terminal end. The arcuate rests 56, 58 are adapted to releasably engage the pivot pin 34 of a wiper blade assembly 24. In addition and as shown throughout the figures, the universal wiper adapter 40 is adapted to operatively engage several different types of wiper arm attachment members 27, namely hook-type wiper arm attachment members 27a–27e, pin-type wiper arm attachment members 27f, and bayonet-type wiper arm attachment members 27g.

Referring to FIGS. 2–4 and 7A–11B, hook-type wiper arm attachment members 27a–e are generally known in the related art to includes a curved forward end 29a–e having an arcuate inner surface 31a–e and a terminal end 33a–e including an aperture 35a–e. The universal wiper adapter 40 of the present invention is adapted to operatively engage five different styles of hook-type wiper arm attachment members 27a–e. To this end, the perimeter of each of the sidewalls 44, 46 adjacent their respective nock 52, 54 defines an arcuate surface 60, 62 that act to operatively retain at least a portion of the curved forward end of a hook-type wiper arm attachment member therebetween (see FIGS. 6B, 7B, 8B, 9B, 10B and 11B). Those having ordinary skill in the art will appreciate that while the perimeter of the sidewalls 44, 46 adjacent the nock 52, 54 includes an arcuate surface 60, 62, the perimeter of the sidewalls 44, 46 adjacent the nock 52, 54 may include any surface to accomplish the same end. By way of example, the perimeter of the sidewalls 44, 46 adjacent the nock 52, 54 may include an octagonal surface that operatively retains a portion of a hook-type wiper arm attachment member.

Specifically referring to FIGS. 2–4, and 7B–8B, the universal wiper adapter 40 includes a land 64 extending between the sidewalls 44, 46 and cooperating with the sidewalls 44, 46 to define a channel 66 therebetween. The land 64 further includes at least two shoulders 68, 70 that traverse the channel 66 parallel to the sidewalls 44, 46. The shoulders 68, 70 define a groove 72 in the land 64. The universal wiper adapter 40 also includes a cantilevered beam 74 extending between the sidewalls 44, 46 in spaced parallel relation to the land 64. The cantilevered beam 74 includes a super-surface 76 that cooperates with the sidewalls 44, 46 to define an elongate passage 78. The super-surface 76 further includes a catch 80 adapted to operatively engage a first hook-type wiper arm attachment member 27a, 27b. The catch 80 extends in the direction of the land 64 and is substantially wedge-shaped to facilitate efficient "slide-over" engagement with the aperture 35a, 35b of the first hook-type wiper arm attachment member 27a, 27b, respectively. Those having ordinary skill in the art will appreciate that the catch 80 may include any shape adapted to operatively engage a first hook-type wiper arm attachment member 27a, 27b. By way of example the catch 80 may include a substantially cylindrical or post-like shape.

Referring to FIGS. 7A–8B, the channel 66 and the elongate passage 78 cooperate to operatively receive a first hook-type wiper arm attachment member 27a, 27b of at least two different sizes. More specifically and referring to FIG. 8B, the groove 72 defined between the shoulders 68, 70 cooperates with the elongate passage 78 to operatively receive a first hook-type wiper arm attachment member 27a having a size of 7 mm. The 7 mm hook-type wiper arm attachment member 27a is retained within the arcuate surfaces 60, 62 of the sidewalls 44, 46. The arcuate inner surface 31a of the 7 mm hook-type wiper attachment member 27a is cooperatively received in mutually arcuate fashion with respect to the arcuate end 65 of the land 64, while the aperture 35a is releasably engaged by the catch 80 within the elongate passage 78. Additionally, the channel 66 cooperates with the elongate passage 78 to operatively receive a first hook-type wiper arm attachment member 27b having a size of 9×3 (FIG. 7B). Referring to FIG. 7B, the 9×3 hook-type wiper arm attachment member 27b is disposed within the channel 66 adjacent the shoulders 68, 70 and retained within the arcuate surfaces 60, 62 of the sidewalls 44,46 when assembled. The arcuate inner surface 29b of the 9×3 hook-type wiper attachment member 27b is cooperatively received in mutually arcuate fashion with respect to the arcuate end 65 of the land 64, while the aperture 35b is releasably engaged by the catch 80 within the elongate passage 78.

Referring now to FIGS. 2–4 and 9A–11B, universal wiper adapter 40 of the present invention further includes structure adapted to operatively engage a second hook-type wiper arm attachment member 27c, 27d, 27e of at least three different sizes. To this end, the cantilevered beam 74 further includes a sub-surface 82 that cooperates with the sidewalls 44, 46 to define an elongate track 84. The sub-surface 82 further includes a tab 86 adapted to operatively engage a second hook-type wiper arm attachment member 27c–e. The channel 66 and the elongate track 84 are adapted to cooperatively receive a second hook-type wiper arm attachment member 27c–e of at least three different sizes (See FIGS. 9b, 10b, and 11b). Referring to FIG. 9B, a 9×4×23 hook-type wiper arm attachment member 27c is disposed adjacent to the shoulders 68,70 within the channel 66, while the curved forward end 29c of the wiper arm attachment member 27c is retained within the arcuate surfaces 60, 63 of the sidewalls 44, 46 and the tab 86 within the elongate track 84 releasably engages the aperture 35c toward the terminal end 33c of the attachment member 27c.

Figure 10A:
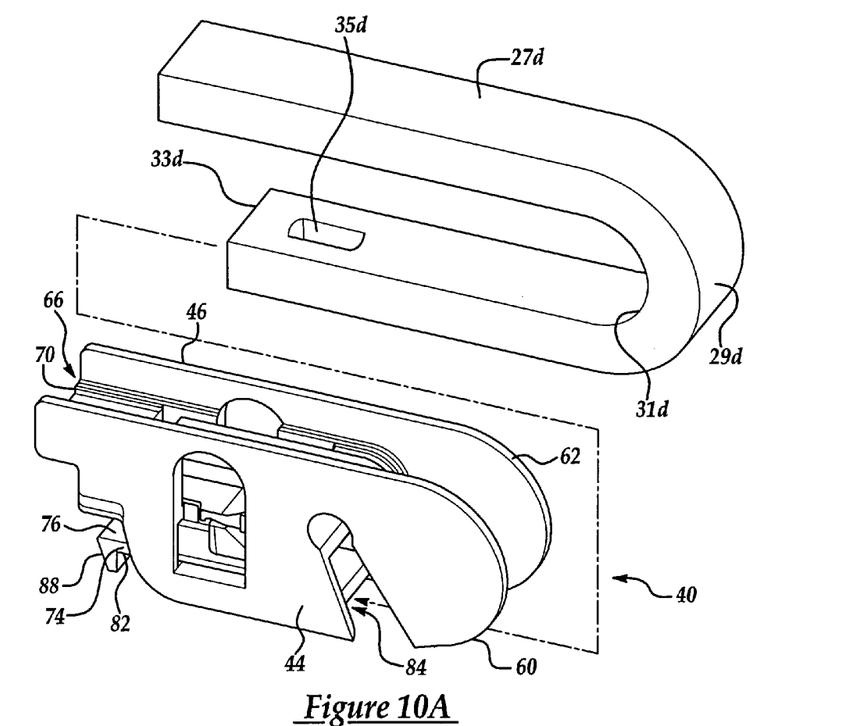
FIG. 10A is an assembly view of the universal wiper adapter illustrating the contact location for a 9×4×28 hook-type wiper arm attachment member.
Figure 10B:
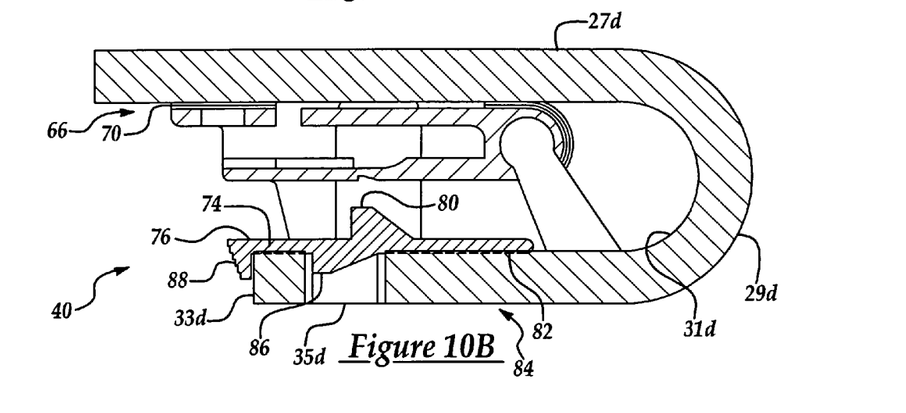
FIG. 10B is a cross-sectional side view of the universal wiper adapter operatively engaged to a 9×4×28 hook-type wiper arm attachment member of the type illustrated in FIG. 10A.

Referring to FIG. 10B, a 9×4×28 hook-type wiper arm attachment member 27d is disposed adjacent to the shoulders 68,70 within the channel 66 and releasably engaged by the tab 86 within the elongate track 84, while the arcuate inner surface 31d of the curved forward end 29d of the wiper arm attachment member 27d substantially corresponds to the plane traversed by the arcuate surfaces 60, 63 of the sidewalls 44, 46 and the tab 86 within the elongate track 84 releasably engages the aperture 35d toward the terminal end 33d of the attachment member 27d.

Figure 11A:
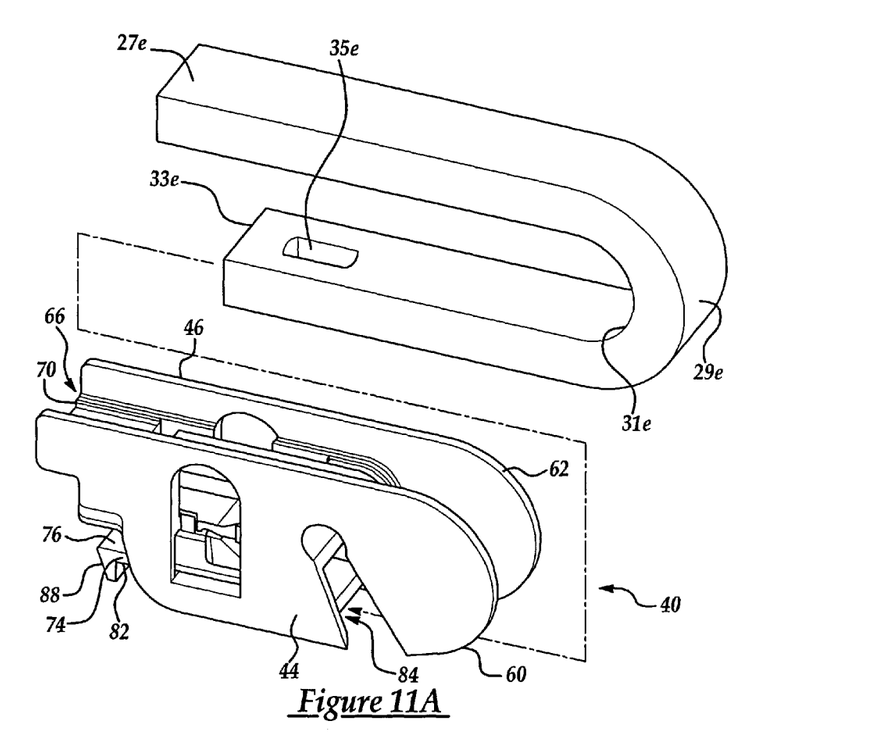
FIG. 11A is an assembly view of the universal wiper adapter illustrating the contact location for a 9×4×33 hook-type wiper arm.
Figure 11B:
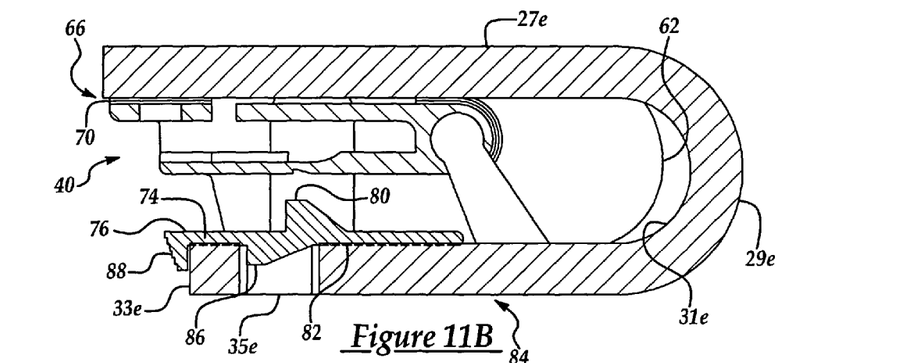
FIG. 11B is a cross-sectional side view of the universal wiper adapter operatively engaged to a 9×4×33 hook-type wiper arm attachment member of the type illustrated in FIG. 11A.

Referring to FIG. 11B, a 9×4×33 hook-type wiper arm attachment member 27e is disposed adjacent to the shoulders 68,70 within the channel 66 and the tab 86 within the elongate track 84 releasably engages the aperture 35e toward the terminal end 33e of the attachment member 27e. With this size attachment member, the curved forward end 29e and the arcuate inner surface 31e of the wiper arm attachment member 27e extend beyond the plane traversed by the arcuate surfaces 60, 63 of the sidewalls 44, 46.

As shown throughout the Figures, the cantilevered beam 74 further includes a flanged terminal end 88 adapted to facilitate releasable engagement of both a first hook-type wiper arm attachment member 27a–b that engages the catch 80 along the super-surface 76 of the cantilevered beam 74 and second hook-type wiper arm attachment member 27c–e that engages the tab 86 along the sub-surface 82 of the cantilevered beam 74. However, those having ordinary skill in the art will appreciate that the present invention may employ any structure adapted to facilitate releasable engagement of a first or second hook-type wiper arm attachment member 27a–e. By way of example, the universal wiper adapter 40 of the present invention may forego the inclusion of a flanged terminal end 88 and merely lengthen the cantilevered beam 74 to extend beyond the terminal end of a first or second hook-type wiper arm attachment members 27a–e to facilitate releasable engagement of same.

Referring to FIGS. 2–5B, the universal wiper adapter 40 of the present invention is adapted to operatively engage two different styles of pin-type wiper arm attachment members 27f. To this end, the universal wiper adapter 40 of the present invention further includes a substrate 90 extending between the sidewalls 44, 46 in parallel relation to and disposed between the land 64 and the cantilevered beam 74. The substrate 90 cooperates with the land 64 and the apertures 48, 50 to operatively receive at least two different diameter pin-type wiper arm attachment members 27f, namely a 3/16 inch or a 1/4 inch diameter pin-type wiper arm attachment members. More specifically, with reference to FIGS. 4–5B, the land 64 further includes a cantilevered deck 92 adapted to move in cantilevered fashion to releasably engage a pin-type wiper arm attachment member 27f that is inserted through the apertures 48, 50 and between the cantilevered deck 92 and the substrate 90. The substrate 90 further includes a saddle 94 aligned with the apertures 48, 50 to operatively receive a pin-type wiper arm attachment member 27f. The saddle 94 defines an arcuate surface 95 that acts to cooperatively retain the pin-type attachment member 27f. Although the universal wiper adapter 40 of the present invention incorporates the saddle 94 within the substrate 90 and the cantilevered deck 92 within the land 64, those having ordinary skill in the art will appreciate that the saddle 94 and the cantilevered action of the cantilevered deck 92 may be incorporated within the sidewalls 44, 46 to accomplish the same end.

Figure 4:
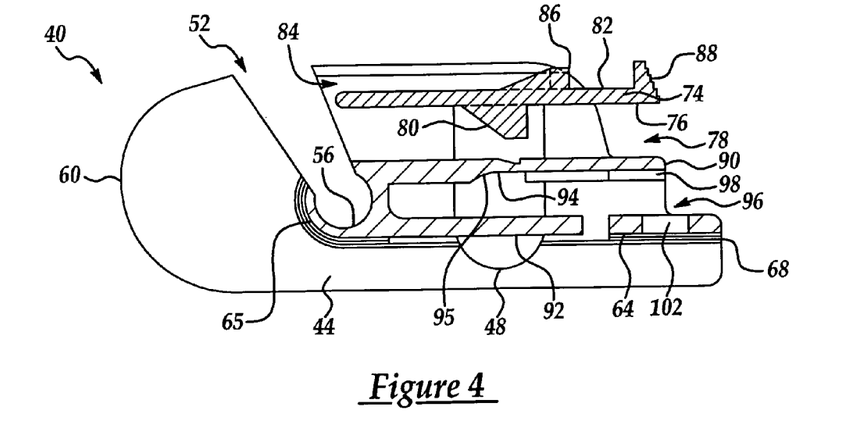
FIG. 4 is a cross-sectional side view of the universal wiper adapter according to an embodiment of the present invention.
Figure 5A:
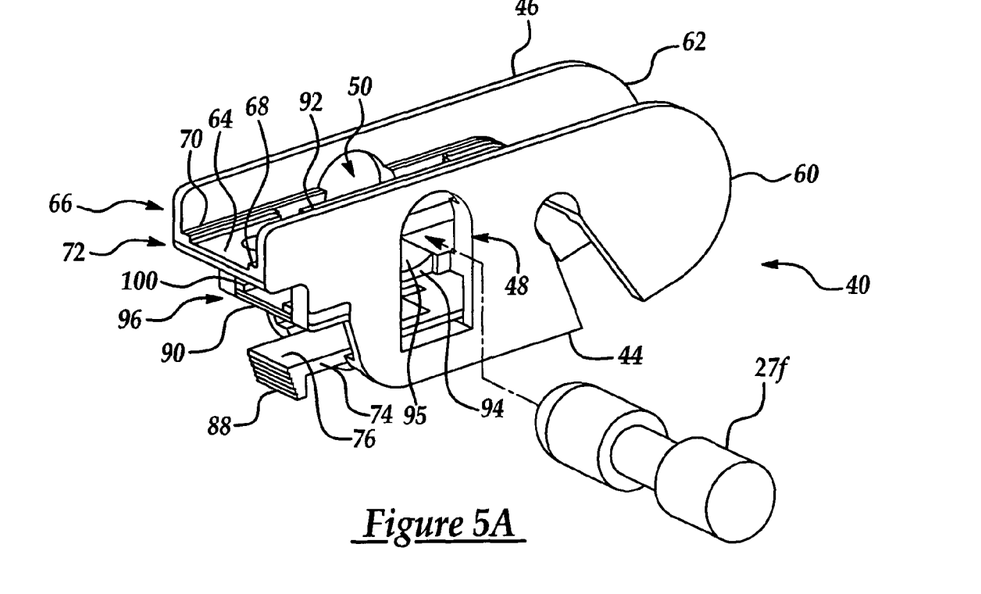
FIG. 5A is an assembly view of the universal wiper adapter illustrating the contact location for a pin-type wiper arm attachment member.
Figure 5B:
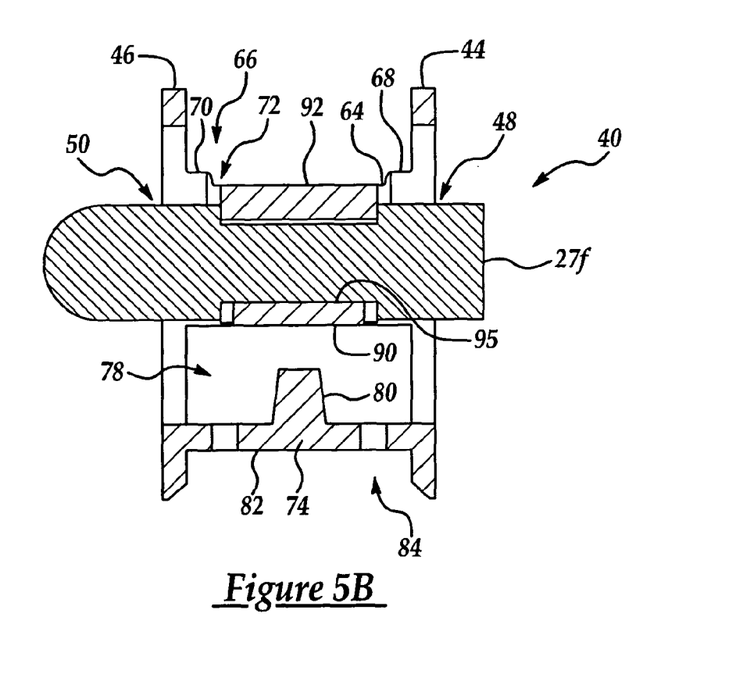
FIG. 5B is a cross-sectional front view of the universal wiper adapter operatively engaged to a pin-type wiper arm attachment member of the type illustrated in FIG. 5A.
Figure 6A:
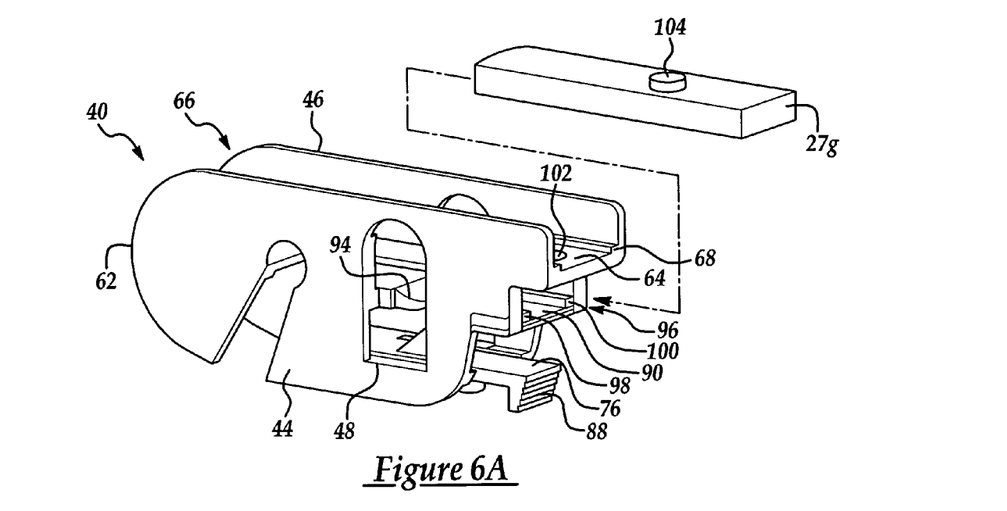
FIG. 6A is an assembly view of the universal wiper adapter illustrating the contact location for a bayonet-type wiper arm attachment member.
Figure 6B:
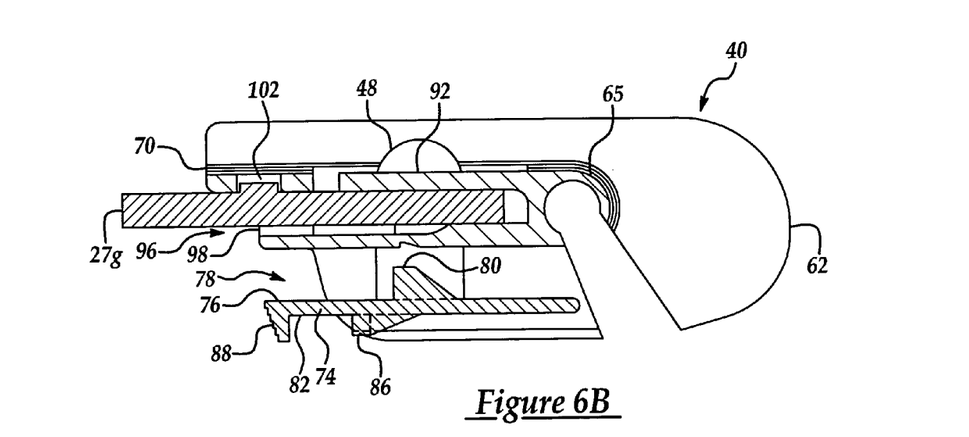
FIG. 6B is a cross-sectional side view of the universal wiper adapter operatively engaged to the bayonet-type wiper arm attachment member of the type illustrated in FIG. 6A.
Figure 7A:
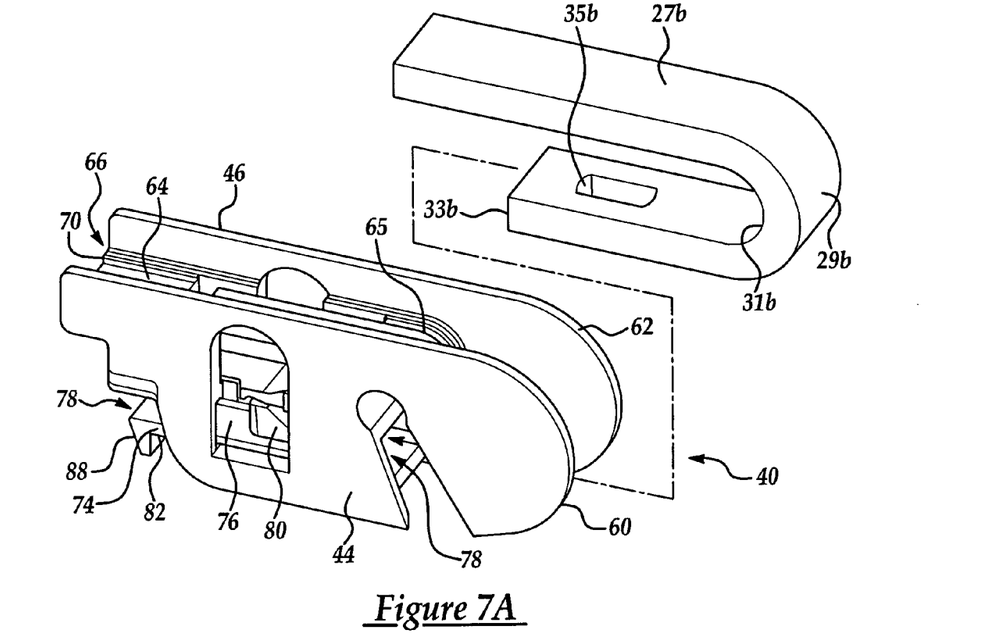
FIG. 7A is an assembly view of the universal wiper adapter illustrating the contact location for a 9×3 hook-type wiper arm attachment member.
Figure 7B:
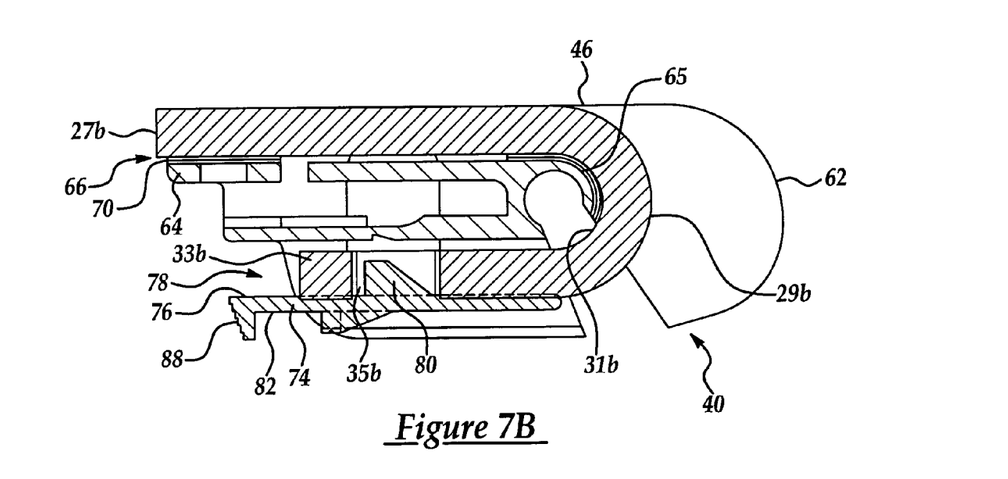
FIG. 7B is a cross-sectional side view of the universal wiper adapter operatively engaged to the 9×3 hook-type wiper arm attachment member of the type illustrated in FIG. 7A.
Figure 8A:
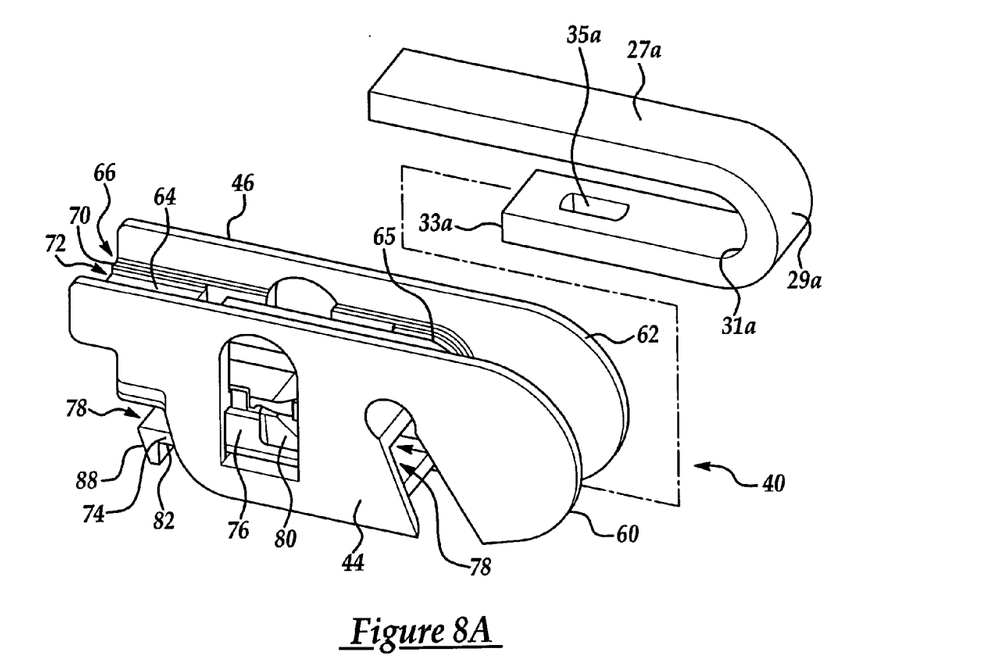
FIG. 8A is an assembly view of the universal wiper adapter illustrating the contact location for a 7 mm hook-type wiper arm attachment member.
Figure 8B:
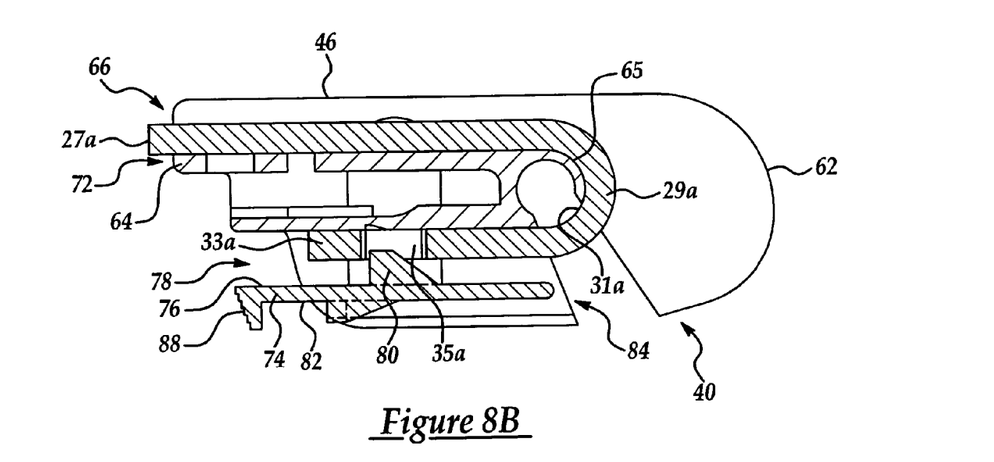
FIG. 8B is a cross-sectional side view of the universal wiper adapter operatively engaged to 7 mm hook-type wiper arm attachment member of the type illustrated in FIG. 8A.
Figure 9A:
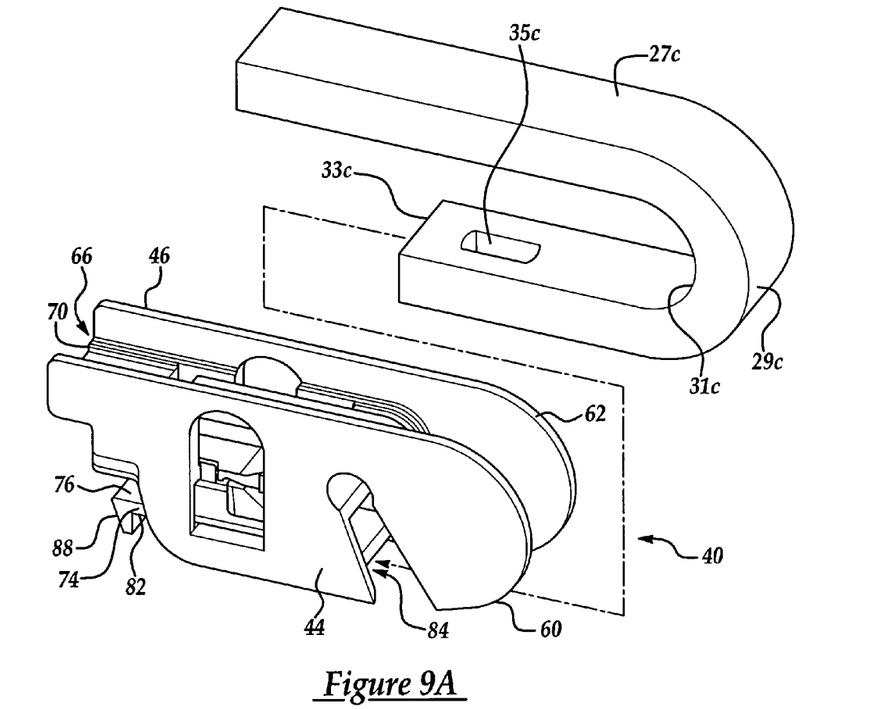
FIG. 9A is an assembly view of the universal wiper adapter illustrating the contact location for a 9×4×23 hook-type wiper arm attachment member.
Figure 9B:
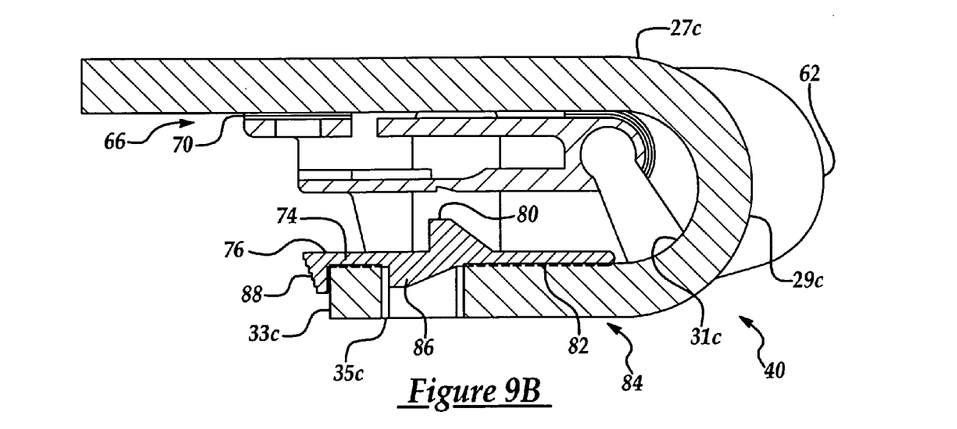
FIG. 9B is a cross-sectional side view of the universal wiper adapter operatively engaged to a 9×4×23 hook-type wiper arm attachment member of the type illustrated in FIG. 9A.

Referring now to FIGS. 2–4 and 6A and 6B, the universal wiper adapter 40 of the present invention is also adapted to operatively engage at least one style of a bayonet-type wiper arm attachment member 27g. To this end, the substrate 90 cooperates with the sidewalls 44, 46 and the land 64 to define an elongate cavity 96 and includes elevated platforms 98, 100 defined within the elongate cavity 96. The elevated platforms 98, 100 are parallel to the sidewalls 44, 46 and cooperate with the sidewalls 44, 46 and the land 64 to operatively receive a bayonet-type wiper attachment member 27g. Referring specifically to FIGS. 4, 6A and 6B, the land 64 includes a port 102 disposed between the shoulders 68, 70 and adjacent the cantilevered deck 92. The port 102 is adapted to releasably engage a bayonet-type wiper arm attachment member 27g having a nub 104.

While the universal wiper adapter 40 of the present invention is adapted to operatively engage a bayonet-type wiper arm attachment member 27g having a nub 104, those having ordinary skill in the art will appreciate that the universal wiper adapter 40 may also operatively engage a screw-style bayonet-type wiper arm attachment member. In those instances where a screw-style bayonet-type wiper arm attachment member is employed, the port 102 will operatively receive the screw member secured to a threaded hole within the screw-style bayonet-type wiper arm attachment member.

The universal wiper adapter 40 of the present invention is preferably manufactured via injection molding and constructed from a polymer, such as plastic. However, the universal wiper adapter 40 may alternatively be manufactured via cast molding and/or constructed from a lightweight metal, such as aluminum. Additionally, such innovative methods of manufacture and construction material may become known so as to provide a more cost-effective or otherwise preferable approach to construction and/or manufacture of the present invention than those disclosed above. Accordingly, such construction materials and methods of manufacture are within the scope of this invention.

The present invention provides a universal wiper adapter 40 adapted to operatively engage a plurality of different wiper arm attachment members 27a–g. Accordingly, the present invention is an improvement over universal wiper adapters known in the art in that it increases the number of wiper arm assemblies 26 capable of being secured to a wiper blade assembly 24 through the present invention. Further, by increasing the number of wiper arm assemblies 26 capable of being secured to the wiper blade assembly 24, the universal wiper adapter 40 of the present invention reduces the need to manufacture several different universal wiper blade adapters. The universal wiper adapter 40 of the present invention is specifically designed to accept a number of different attachment mechanisms employed by the OEMs in the related art. Accordingly, the present invention provides a universal wiper adapter 40 that is mechanically efficient and cost effective to manufacture.

The universal wiper adapter 40 of the present invention may also be included as a component of a wiper blade assembly replacement system. Accordingly, the universal wiper adapter 40 of the present invention reduces the amount of universal adapters packaged within an aftermarket wiper blade assembly replacement system. Further, the present invention simplifies the task of replacing a wiper blade assembly 24 by reducing the need for multiple universal wiper adapters incorporated within a single aftermarket wiper blade assembly replacement system.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A universal wiper adapter for use in connecting a wiper blade assembly to a wiper arm attachment member, said wiper adapter comprising:

a pair of sidewalls each including an aperture aligned with respect to each other and a land extending between said sidewalls cooperating to define a channel therebetween;

a cantilevered beam extending between said sidewalls in spaced parallel relation to said land, said cantilevered beam including a super-surface cooperating with said sidewalls and said land to define an elongate passage, said channel and said elongate passage cooperating to operatively receive a first hook-type wiper arm attachment member of at least two different sizes, said cantilevered beam further including a sub-surface cooperating with said sidewalls to define an elongate track, said channel and said elongate track cooperating to operatively receive a second hook-type wiper arm attachment member of at least three different sizes and;

a substrate extending between said sidewalls in parallel relation to and disposed between said land and said cantilevered beam, said substrate cooperating with said land and said apertures to receive at least two different diameter pin-type wiper arm attachment members and further cooperating with said sidewalls and said land to define an elongate cavity, said substrate including at least one elevated platform disposed therein, wherein said elongate cavity is adapted to operatively receive at least one style bayonet-type wiper arm attachment member and said land further includes a cantilevered deck adapted to move in cantilevered fashion to releasably engage a pin-type wiper arm attachment member that is inserted through said apertures and between said cantilevered deck and said substrate.

2. The universal wiper adapter as set forth in claim 1 wherein said super-surface further includes a catch adapted to operatively engage a first hook-type wiper arm attachment member and said sub-surface further includes a tab adapted to operatively engage a second hook-type wiper arm attachment member.

3. The universal wiper adapter as set forth in claim 1 wherein said cantilevered beam further includes a flanged terminal end adapted to facilitate releasable engagement of hook-type wiper arm attachment members.

4. The universal wiper adapter as set forth in claim 1 wherein said land further includes at least two shoulders traversing said channel parallel to said sidewalls, said land and said shoulders defining a groove in said land adapted to operatively receive a hook-type wiper arm attachment member.

5. The universal wiper adapter as set forth in claim 1 wherein each of said sidewalls further include a nock aligned with respect to each other having a rest at their terminal end, said rest adapted to releasably engage a wiper blade assembly.

6. The universal wiper adapter as set forth in claim 5 wherein the perimeter of said sidewalls adjacent said nock define a pair of arcuate surfaces that act to operatively retain at least a portion of the curved forward end of a hook-type wiper arm attachment member therebetween.

7. The universal wiper adapter as set forth in claim 1 wherein said substrate further includes a saddle aligned with said apertures to operatively receive a pin-type wiper arm attachment member.

8. The universal wiper adapter as set forth in claim 1 wherein said substrate further includes elevated platforms disposed within said elongate cavity parallel to said sidewalls, said elevated platforms cooperating with said sidewalls and said land to operatively receive a bayonet-type wiper attachment member.

9. The universal wiper adapter as set forth in claim 1 wherein said land includes a port disposed between said shoulders to releasably engage a bayonet-type wiper arm attachment member.

10. A wiper blade assembly replacement system for use in connection with a wiper arm having any number of wiper arm attachment members comprising:

a wiper blade assembly including a wiper element, a superstructure secured to said wiper element, and a pivot pin incorporated within a substantially central portion of said superstructure;

a universal wiper adapter including a pair of sidewalls, each having a nock including a rest at a terminal end of said nock adapted to releasably engage said pivot pin, each of said sidewalls further having an aperture aligned with respect to each other, said universal wiper adapter further including a land extending between said sidewalls cooperating to define a channel therebetween, said universal wiper adapter further including a cantilevered beam extending between said sidewalls in parallel relation to said land, including a super-surface cooperating with said sidewalls and said land to define an elongate passage, said channel and said elongate passage cooperating to operatively receive a first hook-type wiper arm attachment member of at least two different sizes, said cantilevered beam further including a sub-surface cooperating with said sidewalls to define an elongate track, said channel and said elongate track cooperating to operatively receive a second hook-type wiper arm attachment member of at least three different sizes, and said universal wiper adapter further including a substrate extending between said sidewalls in parallel relation to and juxtaposed between said land and said cantilevered beam, said substrate cooperating with said land and said apertures to receive at least two different diameter pin-type wiper arm attachment members and further cooperating with said sidewalls and said land to define an elongate cavity, said substrate including at least one elevated platform disposed therein, wherein said elongate cavity is adapted to operatively receive at least one style bayonet-type wiper arm attachment member and said land further includes a cantilevered deck adapted to move in cantilevered fashion to releasably engage a pin-type wiper arm attachment member that is inserted through said apertures and between said cantilevered deck and said substrate.

11. The universal wiper adapter as set forth in claim 10 wherein said super-surface further includes a catch adapted to operatively engage a first hook-type wiper arm attachment member and said sub-surface further includes a tab adapted to operatively engage a second hook-type wiper arm attachment member.

12. The universal wiper adapter as set forth in claim 10 wherein said cantilevered beam further includes a flanged terminal end adapted to facilitate releasable engagement of hook-type wiper arm attachment members.

13. The universal wiper adapter as set forth in claim 10 wherein said land further includes at least two shoulders traversing said channel parallel to said sidewalls, said land and said shoulders defining a groove in said land adapted to operatively receive a hook-type wiper arm attachment member.

14. The universal wiper adapter as set forth in claim 10 wherein the perimeter of said sidewalls adjacent said nock define a pair of arcuate surfaces that act to operatively retain at least a portion of the curved forward end of a hook-type wiper arm attachment member therebetween.

15. The universal wiper adapter as set forth in claim 10 wherein said substrate further includes a saddle aligned with said apertures to operatively receive a pin-type wiper arm attachment member.

16. The universal wiper adapter as set forth in claim 10 wherein said substrate further includes two elevated platforms disposed within said elongate cavity parallel to said sidewalls, said elevated platforms cooperating with said sidewalls and said land to operatively receive a bayonet-type wiper attachment member.

17. The universal wiper adapter as set forth in claim 10 wherein said land includes a port disposed between said shoulders adapted to releasably engage a bayonet-type wiper arm attachment member.

18. A windshield wiper assembly for use in connection with a wiper arm having any number of wiper arm attachment members comprising:
  a wiper including a wiper element, at least one lever secured to said wiper element, and a pivot pin incorporated within a substantially central portion of said lever;
  a universal wiper adapter including a pair of sidewalls, each having a nock including a rest at a terminal end of said nock adapted to releasably engage said pivot pin, each of said sidewalls further having an aperture aligned with respect to each other, said universal wiper adapter further including a land extending between said sidewalls cooperating to define a channel therebetween, said universal wiper adapter further including a cantilevered beam extending between said sidewalls in parallel relation to said land, including a super-surface cooperating with said sidewalls and said land to define an elongate passage, said channel and said elongate passage cooperating to operatively receive a first hook-type wiper arm attachment member of at least two different sizes, said cantilevered beam further including a sub-surface cooperating with said sidewalls to define an elongate track, said channel and said elongate track cooperating to operatively receive a second hook-type wiper arm attachment member of at least three different sizes, and said universal wiper adapter further including a substrate extending between said sidewalls in parallel relation to and juxtaposed between said land and said cantilevered beam, said substrate cooperating with said land and said apertures to receive at least two different diameter pin-type wiper arm attachment members and further cooperating with said sidewalls and said land to define an elongate cavity, said substrate including at least one elevated platform disposed therein, wherein said elongate cavity is adapted to operatively receive at least one style bayonet-type wiper arm attachment member and said land further includes a cantilevered deck adapted to move in cantilevered fashion to releasably engage a pin-type wiper arm attachment member that is inserted through said apertures and between said cantilevered deck and said substrate.

\* \* \* \* \*